US012625965B2

(12) United States Patent
Paulraj et al.

(10) Patent No.: US 12,625,965 B2
(45) Date of Patent: May 12, 2026

(54) SYSTEMS AND METHODS FOR SECURE FIRMWARE UPDATES

(71) Applicant: Dell Products, L.P., Round Rock, TX (US)

(72) Inventors: Deepaganesh Paulraj, Bangalore (IN); Mahesh Babu Ramaiah, Bangalore (IN); Rama Rao Bisa, Bangalore (IN); Ajay Shenoy, Bangalore (IN); Manjunath Vishwanath, Bangalore (IN); Sivakami Velusamy, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 211 days.

(21) Appl. No.: 17/935,168

(22) Filed: Sep. 26, 2022

(65) Prior Publication Data

US 2024/0104215 A1 Mar. 28, 2024

(51) Int. Cl.
*G06F 21/57* (2013.01)
*G06F 8/65* (2018.01)

(52) U.S. Cl.
CPC .............. *G06F 21/572* (2013.01); *G06F 8/65* (2013.01)

(58) Field of Classification Search
CPC ................................. G06F 21/572; G06F 8/65
USPC ......................................................... 726/26
See application file for complete search history.

(56) References Cited

U.S. PATENT DOCUMENTS

| | | | | |
|---|---|---|---|---|
| 10,552,145 B2 * | 2/2020 | Rosner | .................... | G06F 12/10 |
| 10,860,305 B1 * | 12/2020 | Harland | .............. | H03K 19/177 |
| 11,012,858 B1 * | 5/2021 | Kozlowski | .............. | H04L 63/18 |
| 2008/0168435 A1 * | 7/2008 | Tupman | .................... | G06F 8/65 |
| | | | | 717/173 |

(Continued)

FOREIGN PATENT DOCUMENTS

| | | | | |
|---|---|---|---|---|
| RU | 2331928 C2 * | 8/2008 | ............. | G07F 17/32 |
| WO | WO-2012028541 A1 * | 3/2012 | ............. | G05B 15/02 |

OTHER PUBLICATIONS

Zandberg, Koen, Kaspar Schleiser, Francisco Acosta, Hannes Tschofenig, and Emmanuel Baccelli. "Secure firmware updates for constrained iot devices using open standards: A reality check." IEEE access 7 (2019): 71907-71920. (Year: 2019).*

(Continued)

*Primary Examiner* — Luu T Pham
*Assistant Examiner* — Walter J Malinowski
(74) *Attorney, Agent, or Firm* — Fogarty LLP

(57) ABSTRACT

Systems and methods prevent nonsecure updates to firmware of an IHS (Information Handling System). During factory provisioning of the IHS, a manifest of firmware loaded for operating a hardware component of the IHS is digitally signed by a remote access controller of the IHS, and the signed manifest is stored to the IHS. Once the IHS has been deployed and during an interval where the IHS does not have access to external networks by which to validate a received firmware update, the signed manifest of loaded firmware is retrieved and used to determine whether the received firmware update is compatible with the loaded firmware of the hardware component. When the update is compatible with the loaded firmware, at least a portion of the loaded firmware is replaced with the firmware update and an updated manifest is digitally signed to reflect availability of the update for use by the hardware component.

20 Claims, 3 Drawing Sheets

(56) References Cited

U.S. PATENT DOCUMENTS

| 2011/0191148 A1* | 8/2011 | Carlson | G06Q 30/0207 |
| | | | 705/14.1 |
| 2012/0124567 A1* | 5/2012 | Landry | G06F 8/654 |
| | | | 717/168 |
| 2014/0156817 A1* | 6/2014 | Slik | H04L 67/1097 |
| | | | 709/221 |
| 2014/0298309 A1* | 10/2014 | Proschowsky | G06F 8/654 |
| | | | 717/170 |
| 2015/0261966 A1* | 9/2015 | Mensch | H04L 63/0876 |
| | | | 713/189 |
| 2018/0103018 A1* | 4/2018 | Chauhan | H04L 63/0485 |
| 2018/0246714 A1* | 8/2018 | Moran | G06F 9/466 |
| 2020/0092193 A1* | 3/2020 | Tillotson | H04L 12/4633 |
| 2020/0104504 A1* | 4/2020 | Chaiken | G06F 21/575 |
| 2020/0177629 A1* | 6/2020 | Hooda | H04L 47/746 |
| 2020/0257518 A1* | 8/2020 | Liedtke | G06F 8/65 |
| 2020/0285457 A1* | 9/2020 | Meriac | H04L 67/34 |
| 2020/0293658 A1* | 9/2020 | Krishna Murthy | H04L 67/125 |
| 2020/0295991 A1* | 9/2020 | Shetty | G06F 3/0647 |
| 2020/0409690 A1* | 12/2020 | Rouland | G06F 8/654 |
| 2021/0120139 A1* | 4/2021 | Kobayashi | H04N 1/00244 |
| 2021/0240489 A1* | 8/2021 | Xie | G06F 21/572 |
| 2021/0243178 A1* | 8/2021 | Leach | H04L 63/0823 |
| 2021/0409258 A1* | 12/2021 | Reed | H04B 3/542 |
| 2022/0006653 A1* | 1/2022 | Ghetie | H04L 9/002 |
| 2022/0156377 A1* | 5/2022 | Xie | G06F 8/65 |
| 2023/0044016 A1* | 2/2023 | Harper | G06F 9/44505 |
| 2023/0133726 A1* | 5/2023 | Wen | H04L 9/3247 |
| | | | 713/2 |
| 2023/0315913 A1* | 10/2023 | Chandra | G06F 21/572 |
| | | | 726/26 |
| 2024/0126886 A1* | 4/2024 | Senft | H04L 9/0825 |
| 2024/0211245 A1* | 6/2024 | Fabrici | G06F 8/65 |

OTHER PUBLICATIONS

Kolehmainen, Antti. "Secure firmware updates for iot: A survey." In 2018 IEEE International Conference on Internet of Things (iThings) and IEEE Green Computing and Communications (GreenCom) and IEEE Cyber, Physical and Social Computing (CPSCom) and IEEE Smart Data (SmartData), pp. 112-117. IEEE, 2018. (Year: 2018).*
Scholl, Philipp, Felix Sutton, and Philipp Sommer. "Secure On-The-Fly Firmware Updates for Safety Critical Embedded Systems." In 2024 IEEE 29th International Conference on Emerging Technologies and Factory Automation (ETFA), pp. 1-7. IEEE, 2024. (Year: 2024).*
Falas, Solon, Charalambos Konstantinou, and Maria K. Michael. "A modular end-to-end framework for secure firmware updates on embedded systems." ACM Journal on Emerging Technologies in Computing Systems (JETC) 18, No. 1 (2021): 1-19. (Year: 2021).*

* cited by examiner

Amended   FIG. 1

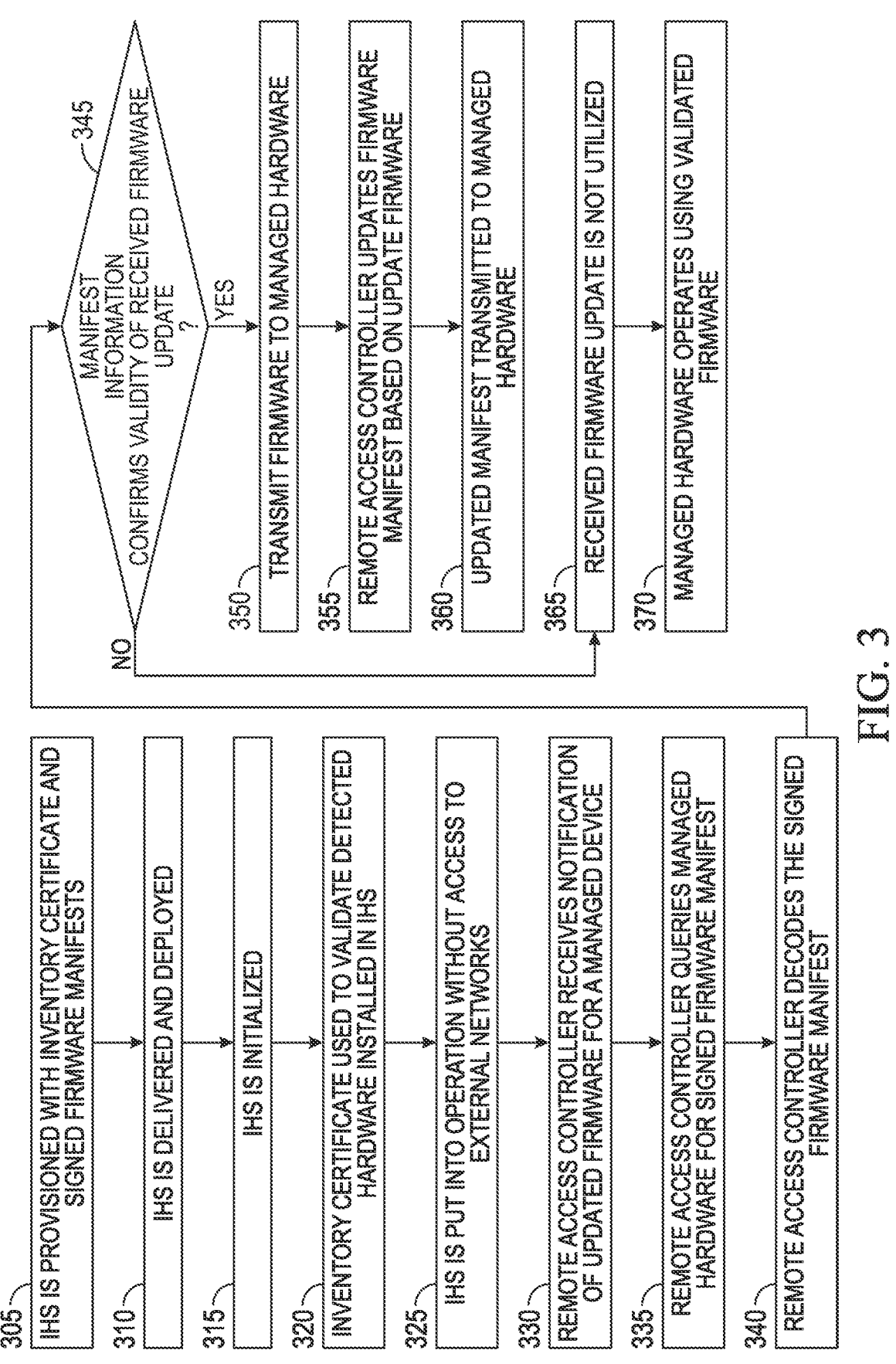

305 — IHS IS PROVISIONED WITH INVENTORY CERTIFICATE AND SIGNED FIRMWARE MANIFESTS

310 — IHS IS DELIVERED AND DEPLOYED

315 — IHS IS INITIALIZED

320 — INVENTORY CERTIFICATE USED TO VALIDATE DETECTED HARDWARE INSTALLED IN IHS

325 — IHS IS PUT INTO OPERATION WITHOUT ACCESS TO EXTERNAL NETWORKS

330 — REMOTE ACCESS CONTROLLER RECEIVES NOTIFICATION OF UPDATED FIRMWARE FOR A MANAGED DEVICE

335 — REMOTE ACCESS CONTROLLER QUERIES MANAGED HARDWARE FOR SIGNED FIRMWARE MANIFEST

340 — REMOTE ACCESS CONTROLLER DECODES THE SIGNED FIRMWARE MANIFEST

345 — MANIFEST INFORMATION CONFIRMS VALIDITY OF RECEIVED FIRMWARE UPDATE?

NO

YES

350 — TRANSMIT FIRMWARE TO MANAGED HARDWARE

355 — REMOTE ACCESS CONTROLLER UPDATES FIRMWARE MANIFEST BASED ON UPDATE FIRMWARE

360 — UPDATED MANIFEST TRANSMITTED TO MANAGED HARDWARE

365 — RECEIVED FIRMWARE UPDATE IS NOT UTILIZED

370 — MANAGED HARDWARE OPERATES USING VALIDATED FIRMWARE

FIG. 3

SYSTEMS AND METHODS FOR SECURE FIRMWARE UPDATES

FIELD

The present disclosure relates generally to Information Handling Systems (IHSs), and relates more particularly to managing firmware used by IHSs.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Various hardware components of an IHS may operate using firmware instructions. From time to time, it is expected that firmware utilized by hardware components of an IHS may be updated. Such firmware updates may be made in order to modify the capabilities of a particular hardware component, such as to address security vulnerabilities or to adapt the operations of the hardware component to a specific computing task. When firmware updates are made to a hardware component of an IHS, it is preferable that the IHS experience no downtime and with minimal degradation in the performance of the IHS. In addition, presented firmware updates must be authenticated in order to prevent loading of malicious firmware instructions and thus compromising the operation of hardware components of an IHS.

SUMMARY

In various embodiments, IHSs may include: one or more CPUs utilizing one or more buses that connect to a plurality of hardware components of the IHS; a remote access controller supporting remote management of the Information Handling System (IHS), the remote access controller comprising a logic unit and a memory device having instructions stored thereon that, upon execution by the logic unit, cause the remote access controller to: during factory provisioning of the IHS, digitally sign a manifest of firmware loaded for operation by a first of the hardware components of the IHS and store the digitally signed firmware manifest to the IHS; upon deployment of the IHS, receive an update to firmware used to operate the first hardware component; in response to the receipt of the firmware update, retrieve the digitally signed manifest of loaded firmware; based on the firmware manifest, determine whether the received firmware update is compatible with the firmware loaded for operation by the first hardware component during the factory provisioning of the IHS; when the received firmware update is compatible with the loaded firmware, replace at least a portion of the firmware loaded during the factory provisioning of the IHS with the firmware update and digitally sign an updated firmware manifest to reflect availability of the firmware update for use by the first hardware component; and when the received firmware update is not compatible with the loaded firmware, prevent use of the received firmware update.

In some IHS embodiments, the firmware update is received and the firmware manifest is used to evaluate the compatibility of the firmware update with the loaded firmware during an interval where the IHS does not have access to any external networks. In some IHS embodiments, the firmware manifest identifies a firmware image stored by first hardware component and wherein the compatibility of the firmware update with the loaded firmware is determined based on whether the firmware update is consistent with the firmware image stored by the first hardware component. In some IHS embodiments, the firmware manifest is digitally signed by the remote access controller using a private keypair of the remote access controller. In some IHS embodiments, the signed firmware manifest is cryptographically bound to the remote access controller. In some IHS embodiments, the firmware manifest comprises a plurality of digital signatures corresponding to the firmware that is loaded for operation by the first hardware component during the factory provisioning of the IHS. In some IHS embodiments, the firmware manifest comprises a mapping of firmware boundaries within the firmware image. In some IHS embodiments, the compatibility of the firmware update with the loaded firmware is further determined based on whether the a of the firmware update is consistent with the mapped firmware boundaries within the firmware image. In some IHS embodiments, the firmware update comprises an update to a portion of the firmware image stored within a mapped firmware boundary specified in the firmware manifest. In some IHS embodiments, the preventing of the use of the received firmware update comprises deletion of the firmware update without transmitting any portion of the firmware update to the first hardware component.

In various additional embodiments, methods are provided for preventing nonsecure updates to firmware of a hardware component of an IHS, wherein the firmware updates are managed by a remote access controller of the IHS that provides remote management of the hardware component. The methods may include: during factory provisioning of the IHS, digitally signing a manifest of firmware loaded for operation by a first of the hardware components of the IHS and storing the digitally signed firmware manifest to the IHS; and during an interval where the IHS does not have access to external networks: upon deployment of the IHS, receiving an update to firmware used to operate the first hardware component; in response to the receipt of the firmware update, retrieving the digitally signed manifest of loaded firmware; based on the firmware manifest, determining whether the received firmware update is compatible with the firmware loaded for operation by the first hardware component during the factory provisioning of the IHS; when the received firmware update is compatible with the loaded firmware, replacing at least a portion of the firmware loaded during the factory provisioning of the IHS with the firmware update and digitally signing an updated firmware manifest to reflect availability of the firmware update for use by the first hardware component; and when the received firmware update is not compatible with the loaded firmware, preventing use of the received firmware update.

In some method embodiments, the firmware manifest identifies a firmware image stored by first hardware component and wherein the compatibility of the firmware update with the loaded firmware is determined based on whether the firmware update is consistent with the firmware image stored by the first hardware component. In some method embodiments, the firmware manifest comprises a plurality of digital signatures corresponding to the firmware that is loaded for operation by the first hardware component during the factory provisioning of the IHS. In some method embodiments, the firmware manifest comprises a mapping of firmware boundaries within the firmware image. In some method embodiments, the compatibility of the firmware update with the loaded firmware is further determined based on whether the size of the firmware update is consistent with the mapped firmware boundaries within the firmware image.

In various additional embodiments, systems may include: a hardware component of an Information Handling System (IHS), wherein operations of the hardware component may be adapted based on updates to firmware utilized by the hardware component; and a remote access controller supporting remote management of the hardware component of the IHS, the remote access controller comprising a logic unit and a memory device having instructions stored thereon that, upon execution by the logic unit, cause the remote access controller to: during factory provisioning of the IHS, digitally sign a manifest of firmware loaded for operation by a first of the hardware components of the IHS and store the digitally signed firmware manifest to the IHS; upon deployment of the IHS, receive an update to firmware used to operate the first hardware component; in response to the receipt of the firmware update, retrieve the digitally signed manifest of loaded firmware; based on the firmware manifest, determine whether the received firmware update is compatible with the firmware loaded for operation by the first hardware component during the factory provisioning of the IHS; when the received firmware update is compatible with the loaded firmware, replace at least a portion of the firmware loaded during the factory provisioning of the IHS with the firmware update and digitally sign an updated firmware manifest to reflect availability of the firmware update for use by the first hardware component; and when the received firmware update is not compatible with the loaded firmware, prevent use of the received firmware update.

In some system embodiments, the firmware update is received and digitally signed manifest of loaded firmware is used to evaluate the compatibility of the firmware update with the loaded firmware during an interval where the IHS does not have access to any external networks. In some system embodiments, the firmware manifest identifies a firmware image stored by first hardware component and wherein the compatibility of the firmware update with the loaded firmware is determined based on whether the firmware update is consistent with the firmware image stored by the first hardware component. In some system embodiments, the firmware manifest is digitally signed by the remote access controller using a private keypair of the remote access controller. In some system embodiments, the preventing of the use of the received firmware update comprises deletion of the firmware update without transmitting any portion of the firmware update to the first hardware component.

BRIEF DESCRIPTION OF THE DRAWINGS

The present invention(s) is/are illustrated by way of example and is/are not limited by the accompanying figures.

Elements in the figures are illustrated for simplicity and clarity, and have not necessarily been drawn to scale.

FIG. 3 is a flow chart diagram illustrating certain steps of methods, according to some embodiments, for preventing nonsecure updates to firmware used by hardware components of an IHS.

DETAILED DESCRIPTION

Figure 1:
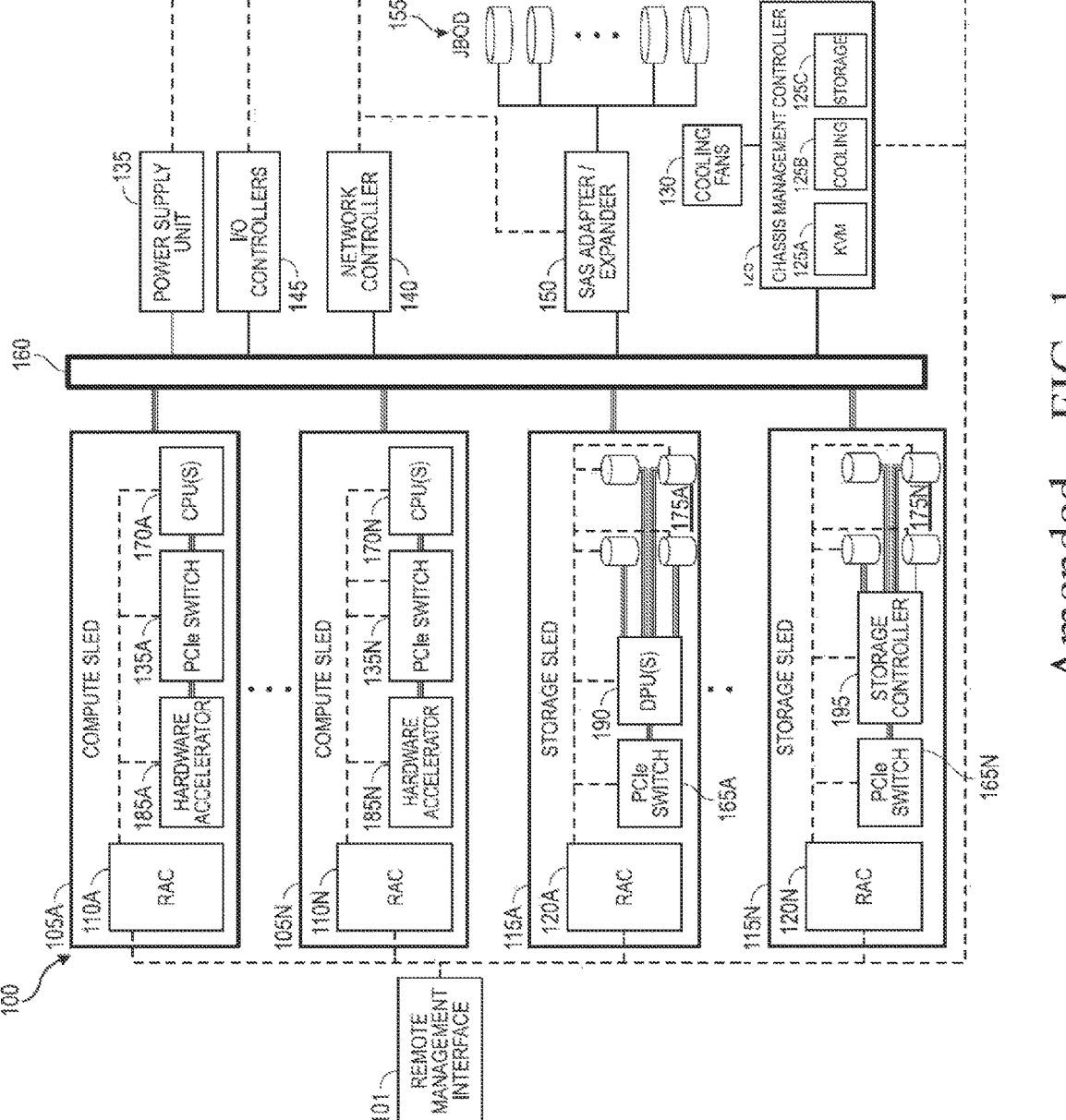
FIG. 1 is a diagram illustrating certain components of a chassis configured, according to some embodiments, for preventing nonsecure updates to firmware used by hardware components installed in the chassis.

FIG. 1 is a block diagram illustrating certain components of a chassis 100 comprising one or more compute sleds 105a-n and one or more storage sleds 115a-n that may be configured to implement the systems and methods described herein for preventing nonsecure updates to firmware used by hardware components of IHSs installed in the chassis 100. Embodiments of chassis 100 may include a wide variety of hardware configurations in which one or more IHS 105a-n, 115a-n are installed in chassis 100. Such variations in hardware configuration may result from chassis 100 being factory assembled to include components specified by a customer that has contracted for manufacture and delivery of chassis 100.

Upon delivery and deployment of a chassis 100, the chassis 100 may be modified by replacing and/or adding various hardware components, in addition to replacement of the removeable IHSs 105a-n, 115a-n that are installed in the chassis. In addition, once the chassis 100 has been deployed, firmware used by individual hardware components of the IHSs 105a-n, 115a-n, or by other hardware components of chassis 100, may be modified in order to update the operations that are supported by these hardware components. In some embodiments, such firmware updates may be used to enable and disable features of an IHS and/or chassis that have been licensed for use by an owner or operator of the chassis 100, where the features that have been enabled and conditions for use of the enabled features may be set forth in a service agreement that is associated with the chassis 100.

Chassis 100 may include one or more bays that each receive an individual sled (that may be additionally or alternatively referred to as a tray, blade, and/or node) IHSs, such as compute sleds 105a-n and storage sleds 115a-n. Chassis 100 may support a variety of different numbers (e.g., 4, 8, 16, 32), sizes (e.g., single-width, double-width) and physical configurations of bays. Embodiments may include additional types of sleds that provide various storage, power and/or processing capabilities. For instance, sleds installable in chassis 100 may be dedicated to providing power management or networking functions. Sleds may be individually installed and removed from the chassis 100, thus allowing the computing and storage capabilities of a chassis to be reconfigured by swapping the sleds with different types of sleds, in some cases at runtime without disrupting the ongoing operations of the other sleds installed in the chassis 100.

Multiple chassis 100 may be housed within a rack. Data centers may utilize large numbers of racks, with various different types of chassis installed in various configurations of racks. The modular architecture provided by the sleds, chassis and racks allow for certain resources, such as cooling, power and network bandwidth, to be shared by the compute sleds 105a-n and storage sleds 115a-n, thus providing efficiency improvements and supporting greater computational loads. For instance, certain computational tasks, such as computations used in machine learning and other artificial intelligence systems, may utilize computational and/or storage resources that are shared within an IHS, within an individual chassis 100 and/or within a set of IHSs that may be spread across multiple chassis of a data center.

Implementing computing systems that span multiple processing components of chassis 100 is aided by high-speed data links between these processing components, such as PCIe connections that form one or more distinct PCIe switch fabrics that are implemented by PCIe switches 135a-n, 165a-n installed in the IHSs 105a-n, 115a-n of the chassis. These high-speed data links may be used to support algorithm implementations that span multiple processing, networking and storage components of an IHS and/or chassis 100. For instance, computational tasks may be delegated to a specific processing component of an IHS, such as to a hardware accelerator 185a-n that may include one or more programmable processors that operate separate from the main CPUs 170a-n of computing sleds 105a-n. In various embodiments, such hardware accelerators 185a-n may include DPUs (Data Processing Units), GPUs (Graphics Processing Units), SmartNICs (Smart Network Interface Card) and/or FPGAs (Field Programmable Gate Arrays). These hardware accelerators 185a-n operate according to firmware instructions that may be occasionally updated, such as to adapt the capabilities of the respective hardware accelerators 185a-n to specific computing tasks. In some instances, firmware updates to hardware accelerators 185a-n may serve to adapt the hardware accelerator for a particular computing function, or for a particular operating environment.

Chassis 100 may be installed within a rack structure that provides at least a portion of the cooling utilized by the IHSs 105a-n, 115a-n installed in chassis 100. In supporting airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air away from sleds 105a-n, 115a-n installed within the chassis. In this manner, a rack and a chassis 100 installed within the rack may utilize various configurations and combinations of cooling fans to cool the sleds 105a-n, 115a-n and other components housed within chassis 100.

The sleds 105a-n, 115a-n may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160 and between different components mounted on the printed circuit board of the backplane 160. In the illustrated embodiment, the connectors for use in coupling sleds 105a-n, 115a-n to backplane 160 include PCIe couplings that support high-speed data links with the sleds 105a-n, 115a-n. In various embodiments, backplane 160 may support various types of connections, such as cables, wires, midplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140, chassis management controller 125 and power supply unit 135.

Figure 2:
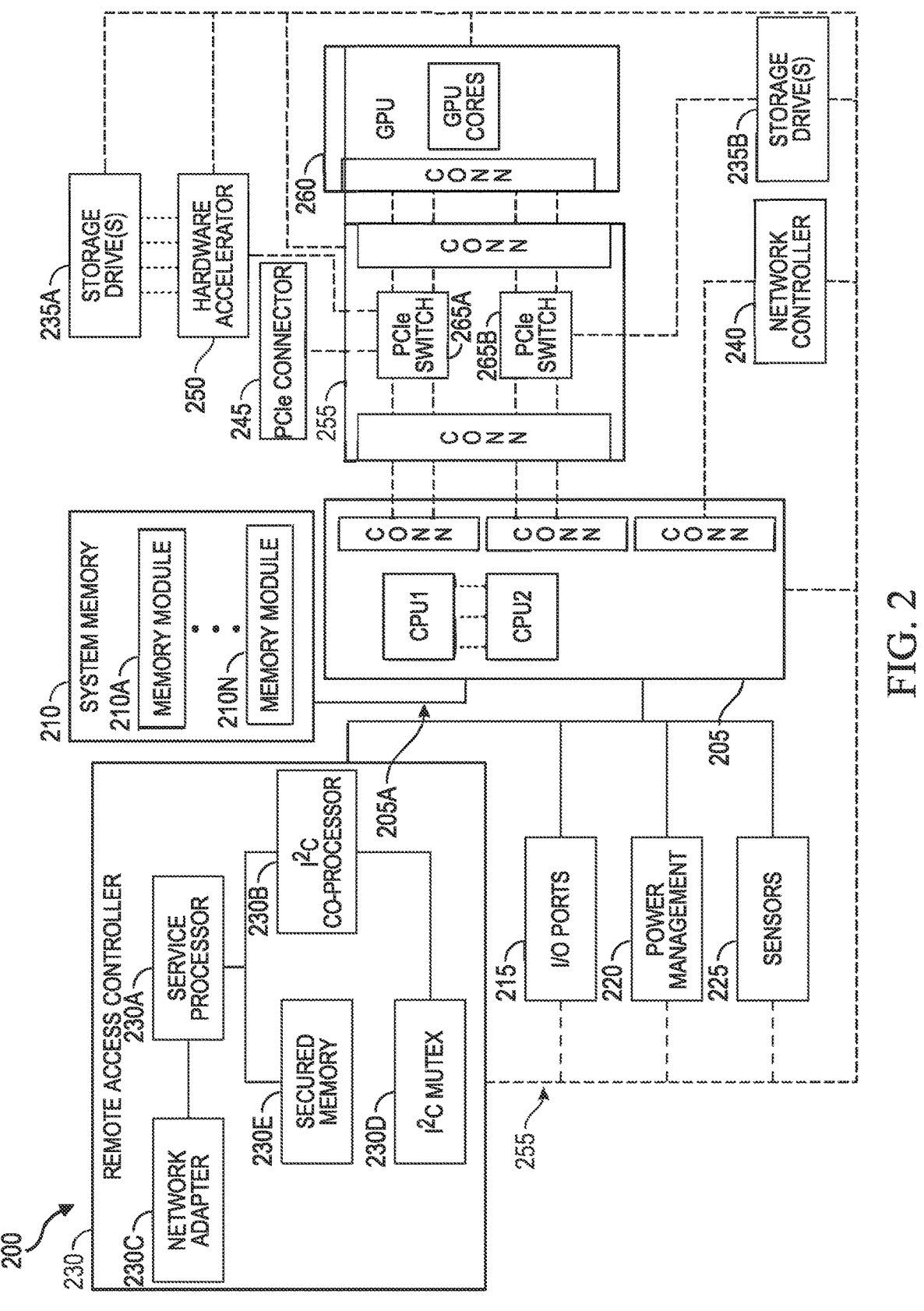
FIG. 2 is a diagram illustrating certain components of an IHS configured, according to some embodiments, for preventing nonsecure updates to firmware used by hardware components of the IHS.

In certain embodiments, each individual sled 105a-n, 115a-n-n may be an IHS such as described with regard to IHS 200 of FIG. 2. Sleds 105a-n, 115a-n may individually or collectively provide computational processing resources that may be used to support a variety of e-commerce, multimedia, business and scientific computing applications, such as artificial intelligence systems provided via cloud computing implementations. Sleds 105a-n, 115a-n are typically configured with hardware and software that provide leading-edge computational capabilities. Accordingly, services that are provided using such computing capabilities are typically provided as high-availability systems that operate with minimum downtime.

In high-availability computing systems, such as may be implemented using embodiments of chassis 100, any downtime that can be avoided is preferred. As described above, firmware updates are an expected in the administration and operation of data centers, but it is preferable to avoid any downtime in making such firmware updates. However, received firmware updates are preferably validated as being authentic prior to actually using the firmware update to modify the firmware instructions that are used to operate the hardware component. In most deployments of a chassis 100, received firmware updates may be authenticated through validation of digital signatures presented in conjunction with the firmware updates, where the digital signatures are validated by a certificate authority that can attest to secure ownership of the keypair used to generate the digital signature. Such validations of a firmware update are effective, but require a chassis 100 have network access that allows queries to be made to a certificate authority. In some instances, a chassis 100 is deployed in an environment where the chassis and its constituent components do not have access to external networks, such as the Internet. In these scenarios, presented firmware updates cannot be validated using a certificate authority. Accordingly, embodiments provide capabilities by which remote access controllers 110a-n, 120a-n installed chassis 100 preventing nonsecure updates to hardware components of the chassis, without access to any external network or certificate authority.

As illustrated, each sled 105a-n, 115a-n includes a respective remote access controller (RAC) 110a-n, 120a-n. As described in additional detail with regard to FIG. 2, remote access controller 110a-n, 120a-n provides capabilities for remote monitoring and management of a respective sled 105a-n, 115a-n and/or of chassis 100. In support of these monitoring and management functions, remote access controllers 110a-n may utilize both in-band and side-band (i.e., out-of-band) communications with various managed components of a respective sled 105a-n and chassis 100. Remote access controllers 110a-n, 120a-n may collect various types of sensor data, such as collecting temperature sensor readings that are used in support of airflow cooling of the chassis 100 and the sleds 105a-n, 115a-n. In addition, each remote access controller 110a-n, 120a-n may implement various monitoring and administrative functions related to a respective sleds 105a-n, 115a-n, where these functions may be implemented using sideband bus connections with various internal components of the chassis 100 and of the respective sleds 105*a-n*, 115*a-n*. In various embodiments, these capabilities of the remote access controllers 110*a-n*, 120*a-n* may be utilized in updating the firmware of hardware components of chassis 100 and/or hardware components of the sleds 110*a-n*, 120*a-n*, without having to reboot the chassis or any of the sleds 110*a-n*, 120*a-n*.

The remote access controllers 110*a-n*, 120*a-n* that are present in chassis 100 may support secure connections with a remote management interface 101. In some embodiments, remote management interface 101 provides a remote administrator with various capabilities for remotely administering the operation of an IHS, including initiating updates to the firmware used by hardware components installed in the chassis 100. For example, remote management interface 101 may provide capabilities by which an administrator can initiate updates to the firmware utilized by all of the storage drives 175*a-n* installed in a chassis 100, or to the firmware utilized by all of the storage drives 175*a-n* of a particular model or manufacturer. In some instances, remote management interface 101 may include an inventory of the hardware, software and firmware of chassis 100 that is being remotely managed through the operation of the remote access controllers 110*a-n*, 120*a-n*. The remote management interface 101 may also include various monitoring interfaces for evaluating telemetry data collected by the remote access controllers 110*a-n*, 120*a-n*. In some embodiments, remote management interface 101 may communicate with remote access controllers 110*a-n*, 120*a-n* via a protocol such the Redfish remote management interface. In embodiments, remote management interface 101 may be utilized to initiate updates to firmware utilized by hardware components of chassis 100 and/or IHSs 105*a-n*, 115*a-n*.

In the illustrated embodiment, chassis 100 includes one or more compute sleds 105*a-n* that are coupled to the backplane 160 and installed within one or more bays or slots of chassis 100. Each of the individual compute sleds 105*a-n* may be an IHS, such as described with regard to FIG. 2. Each of the individual compute sleds 105*a-n* may include various different numbers and types of processors that may be adapted to performing specific computing tasks. In the illustrated embodiment, each of the compute sleds 105*a-n* includes a PCIe switch 135*a-n* that provides access to a hardware accelerator 185*a-n*, such as the described DPUs, GPUs, Smart NICs and FPGAs, that may be programmed and adapted for specific computing tasks, such as to support machine learning or other artificial intelligence systems. As described in additional detail below, compute sleds 105*a-n* may include a variety of hardware components, such as hardware accelerator 185*a-n* and PCIe switches 135*a-n*, that operate using firmware that may be occasionally updated, such as to adapt these components for operation in specific environment or for specific types of computations, or to address errors in existing versions of the firmware that is presently in use by these hardware components.

As illustrated, chassis 100 includes one or more storage sleds 115*a-n* that are coupled to the backplane 160 and installed within one or more bays of chassis 100 in a similar manner to compute sleds 105*a-n*. Each of the individual storage sleds 115*a-n* may include various different numbers and types of storage devices. As described in additional detail with regard to FIG. 2, a storage sled 115*a-n* may be an IHS 200 that includes multiple solid-state drives (SSDs) 175*a-n*, where the individual storage drives 175*a-n* may be accessed through a PCIe switch 165*a-n* of the respective storage sled 115*a-n*.

As illustrated, a storage sled 115*a* may include one or more DPUs (Data Processing Units) 190 that provide access to and manage the operations of the storage drives 175*a* of the storage sled 115*a*. Use of a DPU 190 in this manner provides low-latency and high-bandwidth access to numerous SSDs 175*a*. These SSDs 175*a* may be utilized in parallel through NVMe transmissions that are supported by the PCIe switch 165*a* that connects the SSDs 175*a* to the DPU 190. In some instances, PCIe switch 165*a* may be in integrated component of a DPU 190. The immense data storage and retrieval capabilities provided by such storage sled 115*a* implementations may be harnessed by offloading storage operations directed as storage drives 175*a* to a DPU 190*a*, and thus without relying on the main CPU of the storage sled, or of any other component of chassis 100. As indicated in FIG. 1, chassis 100 may also include one or more storage sleds 115*n* that provide access to storage drives 175*n* via a storage controller 195. In some embodiments, storage controller 195 may provide support for RAID (Redundant Array of Independent Disks) configurations of logical and physical storage drives, such as storage drives provided by storage sled 115*n*. In some embodiments, storage controller 195 may be a HBA (Host Bus Adapter) that provides more limited capabilities in accessing storage drives 175*n*.

In addition to the data storage capabilities provided by storage sleds 115*a-n*, chassis 100 may provide access to other storage resources that may be installed components of chassis 100 and/or may be installed elsewhere within a rack that houses the chassis 100. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that, in some instances, may be configured and managed individually and without implementing data redundancy across the various drives 155. The additional storage resources 155 may also be at various other locations within a datacenter in which chassis 100 is installed.

In light of the various manners in which storage drives 175*a-n*, 155 may be coupled to chassis 100, a wide variety of different storage topologies may be supported. Through these supported topologies, storage drives 175*a-n*, 155 may be logically organized into clusters or other groupings that may be collectively tasked and managed. In some instances, a chassis 100 may include numerous storage drives 175*a-n*, 155 that are identical, or nearly identical, such as arrays of SSDs of the same manufacturer and model. Accordingly, any firmware updates to storage drives 175*a-n*, 155 requires the updates to be applied within each of these topologies being supported by the chassis 100. Despite the large number of different storage drive topologies that may be supported by an individual chassis 100, the firmware used by each of these storage devices 175*a-n*, 155 may be occasionally updated.

As illustrated, the chassis 100 of FIG. 1 includes a network controller 140 that provides network access to the sleds 105*a-n*, 115*a-n* installed within the chassis. Network controller 140 may include various switches, adapters, controllers and couplings used to connect chassis 100 to a network, either directly or via additional networking components and connections provided via a rack in which chassis 100 is installed. Network controller 140 operates according to firmware instructions that may be occasionally updated, such as to enable and disable features supported by the network controller.

Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units. Power supply unit 135 may operate according to firmware instructions that may be occasionally updated, such as to adapt the power supply unit for different modes of operation.

Chassis 100 may also include various I/O controllers 140 that may support various I/O ports, such as USB ports that may be used to support keyboard and mouse inputs and/or video display capabilities. Each of the I/O controllers 140 may operate according to firmware instructions that may be occasionally updated, such as to adapt the I/O controller 140 for operation with different external systems. Such I/O controllers 145 may be utilized by the chassis management controller 125 to support various KVM (Keyboard, Video and Mouse) 125a capabilities that provide administrators with the ability to interface with the chassis 100. The chassis management controller 125 may also include a storage module 125c that provides capabilities for managing and configuring certain aspects of the storage devices of chassis 100, such as the storage devices provided within storage sleds 115a-n and within the JBOD 155.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power 135, network bandwidth 140 and airflow cooling 130 that are available via the chassis 100. As described, the airflow cooling 130 utilized by chassis 100 may include an airflow cooling system that is provided by a rack in which the chassis 100 may be installed and managed by a cooling module 125b of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 illustrates an example of an IHS 200 configured to implement systems and methods described herein for preventing nonsecure updates to firmware used by hardware components of IHS 200, in particular firmware updates that are presented during intervals where IHS 200 does not have network access for use in validating the presented firmware updates with an external authority, such as a certificate authority. It should be appreciated that although the embodiments described herein may describe an IHS that is a compute sled or similar computing component that may be deployed within the bays of a chassis, a variety of other types of IHSs, such as laptops and portable devices, may also operate according to embodiments described herein. In the illustrative embodiment of FIG. 2, IHS 200 may be a computing component, such as sled 105a-n, 115a-n or other type of server, such as an 1RU server installed within a 2RU chassis, that is configured to share infrastructure resources provided within a chassis 100. As with chassis 100, firmware updates may be used to enable and disable features of hardware components installed in IHS 100, to address errors existing firmware versions and/or to switch between multiple supported modes of operation by a hardware component.

IHS 200 may utilize one or more system processors 205, that may be referred to as CPUs (Central Processing Units). In some embodiments, CPUs 205 may each include a plurality of processing cores that may be separately delegated with computing tasks. Each of the CPUs 205 may be individually designated as a main processor and as a co-processor, where such designations may be based on delegation of specific types of computational tasks to a CPU 205. In some embodiments, CPUs 205 may each include an integrated memory controller that may be implemented directly within the circuitry of each CPU 205. In some embodiments, a memory controller may be a separate integrated circuit that is located on the same die as the CPU 205. Each memory controller may be configured to manage the transfer of data to and from a system memory 210 of the IHS, in some cases using a high-speed memory bus 205a. The system memory 210 is coupled to CPUs 205 via one or more memory buses 205a that provide the CPUs 205 with high-speed memory used in the execution of computer program instructions by the CPUs 205. Accordingly, system memory 210 may include memory components, such as static RAM (SRAM), dynamic RAM (DRAM), NAND Flash memory, suitable for supporting high-speed memory operations by the CPUs 205. In certain embodiments, system memory 210 may combine persistent non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each CPU 205. All or portions of the chipset may be implemented directly within the integrated circuitry of an individual CPU 205. The chipset may provide the CPU 205 with access to a variety of resources accessible via one or more in-band buses. IHS 200 may also include one or more I/O ports 215 that may be used to couple the IHS 200 directly to other IHSs, storage resources, diagnostic tools, and/or other peripheral components. A variety of additional components may be coupled to CPUs 205 via a variety of in-line busses. For instance, CPUs 205 may also be coupled to a power management unit 220 that may interface with a power system of the chassis 100 in which IHS 200 may be installed. In addition, CPUs 205 may collect information from one or more sensors 225 via a management bus.

In certain embodiments, IHS 200 may operate using a BIOS (Basic Input/Output System) that may be stored in a non-volatile memory accessible by the CPUs 205. The BIOS may provide an abstraction layer by which the operating system of the IHS 200 interfaces with hardware components of the IHS. Upon powering or restarting IHS 200, CPUs 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for execution by CPUs 205. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 230.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As illustrated, CPUs 205 may be coupled to a network controller 240, such as provided by a Network Interface Controller (NIC) card that provides IHS 200 with communications via one or more external networks, such as the Internet, a LAN, or a WAN. In some embodiments, network controller 240 may be a replaceable expansion card or adapter that is coupled to a connector (e.g., PCIe connector of a motherboard, backplane, midplane, etc.) of IHS 200. In some embodiments, network controller 240 may support high-bandwidth network operations by the IHS 200 through a PCIe interface that is supported by the chipset of CPUs 205. Network controller 240 may operate according to firmware instructions that may be occasionally updated.

As indicated in FIG. 2, in some embodiments, CPUs 205 may be coupled to a PCIe card 255 that includes two PCIe switches 265a-b that operate as I/O controllers for PCIe communications, such as TLPs (Transaction Layer Packets), that are transmitted between the CPUs 205 and PCIe devices and systems coupled to IHS 200. Whereas the illustrated embodiment of FIG. 2 includes two CPUs 205 and two PCIe switches 265a-b, different embodiments may operate using different numbers of CPUs and PCIe switches. In addition to serving as I/O controllers that route PCIe traffic, PCIe switches 265a-b include switching logic that can be used to expand the number of PCIe connections that are supported by CPUs 205. PCIe switches 265a-b may multiply the number of PCIe lanes available to CPUs 205, thus allowing more PCIe devices to be connected to CPUs 205, and for the available PCIe bandwidth to be allocated with greater granularity. Each of the PCIe switches 265a-b may operate according to firmware instructions that may be occasionally updated.

Using the available PCIe lanes, the PCIe switches 265a-b may be used to implement a PCIe switch fabric. Also through this switch fabric, PCIe NVMe (Non-Volatile Memory Express) transmission may be supported and utilized in high-speed communications with SSDs, such as storage drives 235a-b, of the IHS 200. Also through this switch fabric, PCIe VDM (Vendor Defined Messaging) may be supported and utilized in managing PCIe-compliant hardware components of the IHS 200, such as in updating the firmware utilized by the hardware components.

As indicated in FIG. 2, IHS 200 may support storage drives 235a-b in various topologies, in the same manner as described with regard to the chassis 100 of FIG. 1. In the illustrated embodiment, storage drives 235a are accessed via a hardware accelerator 250, while storage drives 235b are accessed directly via PCIe switch 265b. In some embodiments, the storage drives 235a-b of IHS 200 may include a combination of both SSD and magnetic disk storage drives. In other embodiments, all of the storage drives 235a-b of IHS 200 may be identical, or nearly identical. In all embodiments, storage drives 235a-b operate according to firmware instructions that may be occasionally updated.

As illustrated, PCIe switch 265a is coupled via a PCIe link to a hardware accelerator 250, such as a DPU, Smart-NIC, GPU and/or FPGA, that may be a connected to the IHS via a removeable card or baseboard that couples to a PCIe connector of the IHS 200. In some embodiments, hardware accelerator 250 includes a programmable processor that can be configured for offloading functions from CPUs 205. In some embodiments, hardware accelerator 250 may include a plurality of programmable processing cores and/or hardware accelerators, that may be used to implement functions used to support devices coupled to the IHS 200. In some embodiments, the processing cores of hardware accelerator 250 include ARM (advanced RISC (reduced instruction set computing) machine) processing cores. In other embodiments, the cores of DPUs 250a-b may include MIPS (microprocessor without interlocked pipeline stages) cores, RISC-V cores, or CISC (complex instruction set computing) (i.e., x86) cores. Hardware accelerator may operate according to firmware instructions that may be occasionally updated.

In the illustrated embodiment, the programmable capabilities of hardware accelerator 250 implements functions used to support storage drives 235a, such as SSDs. In such storage drive topologies, hardware accelerator 250 may implement processing of PCIe NVMe communications with SSDs 235a, thus supporting high-bandwidth connections with these SSDs. Hardware accelerator 250 may also include one more memory devices used to store program instructions executed by the processing cores and/or used to support the operation of SSDs 235a such as in implementing cache memories and buffers utilized in support high-speed operation of these storage drives, and in some cases may be used to provide high-availability and high-throughput implementations of the read, write and other I/O operations that are supported by these storage drives 235a. In other embodiments, hardware accelerator 250 may implement operations in support of other types of devices and may similarly support high-bandwidth PCIe connections with these devices. For instance, in various embodiments, hardware accelerator 250 may support high-bandwidth connections, such as PCIe connections, with networking devices in implementing functions of a network switch, compression and codec functions, virtualization operations or cryptographic functions. As described, in some embodiments, updates to firmware utilized by hardware accelerators 250 may enable and disable features supported by the hardware accelerators 250 and to switch between different modes of operation supported by the hardware accelerators 250.

As illustrated in FIG. 2, PCIe switches 265a-b may also support PCIe couplings with one or more GPUs (Graphics Processing Units) 260. Embodiments may include one or more GPU cards, where each GPU card is coupled to one or more of the PCIe switches 265a-b, and where each GPU card may include one or more GPUs 260. In some embodiments, PCIe switches 265a-b may transfer instructions and data for generating video images by the GPUs 260 to and from CPUs 205. Accordingly, GPUs 260 may include on or more hardware-accelerated processing cores that are optimized for performing streaming calculation of vector data, matrix data and/or other graphics data, thus supporting the rendering of graphics for display on devices coupled either directly or indirectly to IHS 200. In some instances, GPUs may be utilized as programmable computing resources for offloading other functions from CPUs 205, in the same manner as hardware accelerator 250. GPUs 260 may operate according to firmware instructions that may be occasionally updated.

As illustrated in FIG. 2, PCIe switches 265a-b may support PCIe connections in addition to those utilized by GPUs 260 and hardware accelerator 250, where these connections may include PCIe links of one or more lanes. For instance, PCIe connectors 245 supported by a printed circuit board of IHS 200 may allow various other systems and devices to be coupled to the IHS. Through couplings to PCIe connectors 245a, a variety of data storage devices, graphics processors and network interface cards may be coupled to IHS 200, thus supporting a wide variety of topologies of devices that may be coupled to the IHS 200.

As described, IHS 200 includes a remote access controller 230 that supports remote management of IHS 200 and of various internal components of IHS 200. In certain embodiments, remote access controller 230 may operate from a different power plane from the processors 205 and other components of IHS 200, thus allowing the remote access controller 230 to operate, and management tasks to proceed, while the processing cores of IHS 200 are powered off. Various functions provided by the BIOS, including launching the operating system of the IHS 200, and/or functions of a TPM may be implemented or supplemented by the remote access controller 230. In some embodiments, the remote access controller 230 may perform various functions to verify the integrity of the IHS 200 and its hardware components prior to initialization of the operating system of IHS 200 (i.e., in a bare-metal state). In some embodiments, certain operations of the remote access controller 230, such as the operations described herein for securely updating firmware used by managed hardware components of IHS 200, may operate using validated instructions, and thus within the root of trust of IHS 200.

In some embodiments, remote access controller 230 may include a service processor 230a, or specialized microcontroller, that operates management software that supports remote monitoring and administration of IHS 200. The management operations supported by remote access controller 230 may be remotely initiated, updated and monitored via a remote management interface 101, such as described with regard to FIG. 1. Remote access controller 230 may be installed on the motherboard of IHS 200 or may be coupled to IHS 200 via an expansion slot or other connector provided by the motherboard. In some instances, the management functions of the remote access controller 255 may utilize information collected by various managed sensors 225 located within the IHS. For instance, temperature data collected by sensors 225 may be utilized by the remote access controller 230 in support of closed-loop airflow cooling of the IHS 200. As indicated, remote access controller 230 may include a secured memory 230e for exclusive use by the remote access controller in support of management operations.

In some embodiments, remote access controller 230 may implement monitoring and management operations using MCTP (Management Component Transport Protocol) messages that may be communicated to managed devices 205, 235a-b, 240, 250, 255, 260 via management connections supported by a sideband bus 255. In some instances, the sideband management connections supported by remote access controller 230 may include PLDM (Platform Level Data Model) management communications with the managed devices 205, 235a-b, 240, 250, 255, 260 of IHS 200. In some embodiments, the remote access controller 230 may additionally or alternatively use MCTP messaging to transmit Vendor Defined Messages (VDMs) via the in-line PCIe switch fabric supported by PCIe switches 265a-b. For instance, remote access controller 230 may transmit firmware to managed devices utilizing inband signaling, such as VDMs that are transmitted using MCTP over the PCIe switch fabric that is implemented by PCIe switch 255, and/or utilizing sideband signaling, such as PLDM communications transmitted via sideband connections 255 supported by an I2C co-processor 230b of the remote access controller 230.

As illustrated, remote access controller 230 may include a network adapter 230c that provides the remote access controller with network access that is separate from the network controller 240 utilized by other hardware components of the IHS 200. Through secure connections supported by network adapter 230c, remote access controller 230 communicates management information with remote management interface 101. In support of remote monitoring functions, network adapter 230c may support connections between remote access controller 255 and external management tools using wired and/or wireless network connections that operate using a variety of network technologies. As a non-limiting example of a remote access controller, the integrated Dell Remote Access Controller (iDRAC) from Dell® is embedded within Dell servers and provides functionality that helps information technology (IT) administrators deploy, update, monitor, and maintain servers remotely.

Remote access controller 230 supports monitoring and administration of the managed devices of an IHS via a sideband bus interface 255. For instance, messages utilized in device and/or system management may be transmitted using I2C sideband bus 255 connections that may be individually established with each of the respective managed devices 205, 235a-b, 240, 250, 255, 260 of the IHS 200 through the operation of an I2C multiplexer 230d of the remote access controller. As illustrated in FIG. 2, the managed devices 205, 235a-b, 240, 250, 255, 260 of IHS 200 are coupled to the CPUs 205, either directly or directly, via in-line buses that are separate from the I2C sideband bus 255 connections used by the remote access controller 230 for device management.

In certain embodiments, the service processor 230*a* of remote access controller 230 may rely on an I2C co-processor 230*b* to implement sideband I2C communications between the remote access controller 230 and the managed hardware components 205, 235*a-b*, 240, 250, 255, 260 of the IHS 200. The I2C co-processor 230*b* may be a specialized co-processor or micro-controller that is configured to implement a I2C bus interface used to support communications with managed hardware components 205, 235*a-b*, 240, 250, 255, 260 of IHS. In some embodiments, the I2C co-processor 230*b* may be an integrated circuit on the same die as the service processor 230*a*, such as a peripheral system-on-chip feature that may be provided by the service processor 230*a*. The sideband I2C bus 255 is illustrated as single line in FIG. 2. However, sideband bus 255 may be comprises of multiple signaling pathways, where each may be comprised of a clock line and data line that couple the remote access controller 230 to I2C endpoints 205, 235*a-b*, 240, 250, 255, 260.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

FIG. 3 is a flow chart diagram illustrating certain steps of methods, according to some embodiments, for preventing nonsecure updates to firmware used by hardware components of an IHS, such as the IHSs described with regard to FIGS. 1 and 2. Some embodiments of the method of FIG. 3 may begin, at block 305, with the factory assembly and provisioning of an IHS, such as a server IHS described with regard to FIGS. 1 and 2, where the IHS is provisioned to include an inventory certificate that is cryptographically bound to the IHS and that identifies the factory-installed hardware of the IHS, and that also includes a signed firmware manifest for use in validating firmware updates, particularly in scenarios where the firmware update is presented during an interval where the IHS does not have access to external networks by which the authenticity of a presented firmware update can be validated by a trusted authority, such as by a certificate authority.

In order to support secure firmware updates in such scenarios where an IHS has limited or no network connectivity, embodiments may generate a signed firmware manifest that specifies various characteristics of the firmware approved for operation by the managed hardware component, such as the firmware stored to a managed hardware component during factory provisioning of an IHS. As described in additional detail below, a firmware manifest of a managed hardware component may specify metadata describing the firmware and firmware settings that are utilized to operate the hardware component. For instance, a firmware manifest may specify details regarding the firmware image file via which the firmware is stored. In some instances, a firmware image may include instructions sufficient to support multiple different firmware versions. As described, firmware updates may be utilized to update the operations of managed hardware components, such as to reprogram the capabilities of a hardware accelerator, or to switch a network controller between operating using different supported communication protocols. Accordingly, a firmware image may include some firmware instructions that are common to multiple modes of operation, such as firmware instructions implementing core security and I/O capabilities of the hardware component, while other portions of the firmware image include firmware instructions particular to a specific mode of operation by the hardware component. In such instances, the firmware manifest may specify the boundaries within the firmware image that delineate the different types of firmware instructions that may be used to assemble the firmware that is loaded and utilized by the hardware component.

In some instances, an IHS may be manufactured using a factory process that includes multiple phases of assembly, validation and provisioning that must be completed before the IHS is shipped to a customer. As described, an IHS such as a server may be purpose-built for a particular customer such that the server is assembled and provisioned according to specifications provided by the customer. The initial factory assembly of such server IHSs may include the selection of a chassis and the fastening of various hardware components to the selected chassis. Such a factory assembly process may include generating a hardware manifest that tracks the individual hardware components that are installed in an IHS. As described above, the installed hardware components may include standard components and may also include specialized components that have been requested by a specific customer that has contracted for the assembly and delivery of an IHS. For example, a customer request an IHS with a specific set of hardware components installed, where each of the hardware components in the requested configuration operates using a specific firmware version, or where hardware components are configurable to operating in different modes, each supported by a different firmware version.

Once the assembly of an IHS has been completed, the IHS may be subjected to manual and automated inspections that confirm the IHS has been properly assembled and does not include any defects. After confirming an IHS has been assembled without any manufacturing defects, factory provisioning of the IHS may be initiated. In some instances, the provisioning of an IHS at the factory may include various stages that may include stages for loading of firmware, configuring hardware components, and installing an operating system and other software. Various different aspects of this factory provisioning process may be conducted using a factory provisioning application, where this factory provisioning application may run on one or more servers and may interface with an IHS that is being provisioned once a requisite amount of firmware and software has been installed to the IHS.

A hardware manifest of the individual hardware components that are installed in an IHS may be generated during assembly of the IHS. Such a hardware manifest may be a file that includes an entry for each component installed to an IHS, where the entry may specify various characteristics of the component, such as model numbers and installation locations, and may also specify any unique identifiers associated with the component, such as a MAC address or a serial number. The hardware manifest generated during assembly of an IHS is provided to the factory provisioning application that will being used to provision the assembled IHS, which includes installing firmware and other software on the IHS.

As part of the this factory provisioning, one or more firmware versions and associated firmware settings may be loaded for use by various hardware components of the IHS, such as by storing a firmware image to a local image of a respective hardware component, where the firmware image may include instructions capable of supporting multiple approved versions of the firmware for operation of the hardware component. As described, different supported firmware versions may be used to enable or disable certain capabilities that are supported by a managed hardware component. In some embodiments, the one or more firmware versions that are loaded for use by each hardware component during factory provisioning may be determined based on a service agreement or other configuration for the IHS that was selected by a customer as part of the purchase of the IHS. Once the set of firmware versions for each of the hardware components of the IHS has been selected, the factory provisioning application may confirm the authenticity and integrity of the selected firmware versions based on digital signatures provided by hardware component manufacturers or other entities providing the firmware.

In this manner, the factory-provisioning system may upload a firmware image supporting one or more supported firmware versions to at least some of the factory-installed managed hardware components of an IHS. The firmware images may be stored to a firmware volume of a local data storage of the managed hardware component. Based upon the firmware that has been selected for loaded for use by a hardware component, embodiments may generate a firmware manifest for that particular hardware component. Similar to the hardware manifest, a firmware manifest may be a file that includes details describing the firmware that has loaded for use by a hardware component. In particular, the generated firmware manifest may identity the stored locations of various delineated groups of firmware instructions that may be included a firmware image that has been loaded to a local storage of a hardware component. In this manner, a firmware manifest may specify boundaries within the firmware image, where firmware instruction within a bounded region of the firmware image represent a distinct grouping of firmware instructions, such as firmware instructions that provided core capabilities common to all modes of operation by the hardware component or such as firmware instructions that implement specific modes of operation by the hardware component. A separate firmware manifest may be generated for one or more managed hardware components of the an IHS or chassis. Like the hardware manifest, the firmware manifests generated during assembly of an IHS are provided to the factory provisioning application that is being used to provision the assembled IHS.

Based on the hardware inventory specified in the hardware manifest, the factory provisioning application may initiate the generation of an inventory certificate that may be used to validate the detected hardware components of the IHS as the same hardware components that were installed during the factory assembly of the IHS. As described with regard to FIGS. 1 and 2, an IHS may include a remote access controller that provides capabilities for remote management of an IHS, where these remote management capabilities may include sideband management of various managed hardware components of an IHS. In some embodiments, the generation of an inventory certificate for a newly assembled IHS may be initiated via a request from the factory provisioning application to the remote access controller of the IHS. As described with regard to FIG. 2, a remote access controller of an IHS may include cryptographic capabilities that operate within the root of trust of the IHS and that may include the ability to generate cryptographic keypairs. Utilizing such cryptographic capabilities, the remote access controller initiates the creation of an inventory certificate by generating a cryptographic key pair for use in validating the authenticity of detected hardware inventory information.

In some embodiments, the remote access controller generate a certificate signing requests (CSRs) for the generation of a digital identity certificates, where the request specifies the public key of the key pair generated by the remote access controller, and also specifies the factory installed hardware inventory from the hardware manifest that was generated during assembly of the IHS. The hardware manifest identifying the factory installed hardware that is included in the CSR may be signed by the remote access controller using the private key from the generated keypair. The CSR for the requested inventory certificates may then be transmitted to the factory provisioning application. In embodiments, this same cryptographic keypair used to sign the hardware manifest included in the CSR during factory provisioning of an IHS is also used to sign each firmware manifest that has been generated for managed hardware components of the IHS. As described in additional detail below, this signed firmware manifest may be used to validate firmware updates that are presented during intervals when an IHS has limited or no network access. Once the firmware manifest has been digitally signed by the remote access controller, the signed firmware manifest may be stored to a secured location, such as the secured memory of the remote access controller of FIG. 2.

With the signed firmware manifest stored by the IHS, the factory provisioning application may submit the hardware inventory CSR for signing by a factory certificate authority. Upon receipt of the CSR, the factory certificate authority may parse from the CSR: the hardware inventory information, the public key generated by the remote access controller and the information specifying a requested signing key. Based on the information parsed from the CSR, the factory certificate authority generates a digital identity certificate, referred to herein as an inventory certificate, that is associated with the public key provided by the remote access controller and that specifies the factory installed hardware inventory of the IHS.

The factory certificate authority may submit the generated hardware inventory certificate for signing by a hardware security module that may be a dedicated hardware component of a factory provisioning server that safeguards cryptographic keys and implements cryptographic functions utilized in the factory provisioning process. The hardware security module digitally signs the submitted certificate, which is then returned to the factory provisioning application. In some embodiments, the factory provisioning application may retain a copy of signed certificates. In some instances, copies of the inventory certificates may be retained to a data store utilized in providing ongoing support of the IHS once it has been shipped and has been deployed by a customer, such as in issuing updated certificates for an IHS in response to changes to the IHS that result in changes to the hardware components of the IHS.

As with the one or more signed firmware manifests generated for an IHS, the signed inventory certificates may be loaded to the assembled IHS as part of the factory provisioning of the IHS. In some embodiments, the signed inventory certificate may be uploaded to a secured memory of the remote access controller, such as described with regard to FIG. 2. As described, the signed firmware manifest may be stored directly to a local data storage of the respective managed hardware component to which the device certificate corresponds. Each signed firmware manifest may include reference firmware measurements for each firmware version that has been approved for use by the managed hardware component, where separate references measurements may be included for each different version of the firmware that can be assembled from the firmware instructions included within the various firmware boundaries of the firmware image for that hardware component. With the generation and provisioning of the hardware inventory certificate and the signed firmware manifest completed, additional factory provisioning of the assembled IHS may be completed and, at 310, the assembled IHS is shipped from the factory to a customer. The IHS may be received at a data center and may be further provisioned for deployment within a specific computing and/or storage cluster of the data center.

Once received and provisioned, at 315, the IHS is initialized for the purposes of placing the IHS into operation, such as to provide computing services within a data center. As part of the initialization of the IHS, various procedures may be implemented for validating the authenticity of the hardware components of the IHS. As described, an IHS may be factory provisioned to include an inventory certificate that specifies the factory installed hardware components of the IHS. At 320, the authenticity of the factory-provisioned inventory certificate may be validated by presenting the certificate to a certificate authority that can attest to the secure ownership of the cryptographic keys used to sign the hardware inventory certificate. Once the inventory certificate is authenticated, each detected hardware component of the IHS is identified and the hardware component may be initialized only if its detected identity matches a hardware identity specified in the factory provisioned inventory certificate. Once the detected hardware has been authenticated and firmware to be loaded and used by managed hardware components has been authenticated, at 325, the IHS is put into operation and may be assigned a variety of computing tasks, such as described with regard to FIGS. 1 and 2.

In many instances, an IHS will be deployed and operated with access to external networks, thus allowing the IHS to access trusted external authorities that can validated the authenticity of received instructions or other data. However, in some instances, an IHS may be operated in a highly secure and/or remote environment where the IHS does not have access to external networks. In such scenarios, received firmware updates cannot be externally authenticated by an IHS. Allowing such updates to proceed without any validation of the updated instructions may result in security vulnerabilities being introduced and/or updates that are actually downgrades in terms of introducing errors addressed in the firmware already in use by the hardware component.

Accordingly, during ongoing operation of an IHS without access to external networks, at 330, the remote access controller is provided with a notification that a firmware update is requested for a managed hardware component of an IHS. As described, an IHS may include a remote access controller that provides remote management of an IHS and of individual hardware components of an IHS. In embodiments, such a remote access controller of an IHS is tasked with updating firmware that is utilized by managed hardware components of the IHS. Data center administrators or other administrators may utilize management tools to push firmware updates to managed hardware components operating within the data center. For example, a data center administrator may initiate operations for updating the firmware utilized by all SSDs of a certain type within a chassis (that may include over 20 SSDs), where the firmware update may be initiated in order to address a security vulnerability in a particular type of SSD, such as SSDs of a specific model number. Such types of firmware updates may be pushed to the remote access controllers of the IHSs that include the particular type of hardware component that meet the criteria set forth for the firmware update, with the remote access controllers then responsible for completing the updates to the firmware of managed hardware components of the IHS.

In order to evaluate the validity of the received firmware update while operating without access to external networks, at 335, the remote access controller queries the managed hardware component for the factory-provisioned signed firmware manifest for this hardware component. In some embodiments, the factory provisioning of signed firmware manifests may store the individual manifests to a local storage of the individual hardware components that will be managed using the manifests. In some instances, local storage of the individual hardware components may be insufficient or otherwise infeasible for storage of the signed firmware manifest. Accordingly, in some embodiments, the managed hardware component may instead be factory provisioned with a link that provides the location of a signed firmware manifest for that hardware component, where this location may be a secure storage on the IHS.

Once the signed firmware manifest has been retrieved, the remote access controller may validate the integrity of information included in the manifest through use of the cryptographic capabilities of the remote access controller that were used to generate the signed firmware manifest during factory provisioning of the IHS. As described, the firmware manifest may be cryptographically signed and/or encrypted by the remote access controller during factory provisioning. Operating without access to any external networks, any cryptographic certificates presented in support of the validity of the provided firmware update cannot be externally authenticated by the remote access controller. Accordingly, at 340, the remote access controller uses the private keypair utilized during factory provisioning of the signed firmware manifest in order to validate the signed version of the firmware manifest and thus also the integrity of the firmware manifest provided by the managed hardware component. In some instances, the remote access controller may also use this private keypair to decode any encrypted portions of the firmware manifest.

As indicted in FIG. 3, at 345, the remote access controller determines whether the received firmware update is valid and is consistent with the existing firmware of the managed hardware component. In some embodiments, the initial validity determination for a received firmware update may be made based on a digital signature that is provided along with the update. The digital signature may be utilized to validate the integrity of the received firmware instructions, but without network access cannot be validated as authentic by a certificate authority vouching for a key pair used to generate a digital signature presented along with the firmware update. Without access to external networks, embodiments instead evaluate the validity of the firmware update based on the consistency of the receipt firmware update with the existing firmware image stored in a firmware volume of the managed hardware component.

As described, characteristics of the firmware stored in the firmware volume of a managed hardware component may be encoded within a firmware manifest that is signed by the remote access controller and stored by the hardware component. For instance, the firmware manifest may specify firmware boundaries within a firmware image that is stored by the hardware component. In some instances, a firmware update may replace all of the firmware used by a hardware component. However, as described, firmware images can be very large in size and can take considerable time to be transmitted to a managed hardware component, especially for a hardware component that has limited memory and networking resources. Accordingly, in many instances, when only a portion of the firmware utilized by a hardware component is being updated, only the updated portion of the firmware is transmitted to the hardware component. Upon receiving notification of an update to a portion of the firmware utilized by the hardware components, the remote access controller, operating without access to external networks, may determine whether the portion of the firmware presented in the update is compatible with the existing firmware image. In particular, the remote access controller determines whether the received firmware portion can be accommodated within existing firmware image, as determined based on firmware boundaries set forth in the signed firmware manifest.

In some embodiments, the validity of the received firmware update may be determined, additionally or alternatively, based on compatibility information specified in the metadata of the firmware manifest of the hardware component. In such embodiments, the metadata may specify the versions of the individual firmware programs that are contained in the firmware image, and may further specify compatibility information for each of these firmware programs, such as identifying additional compatible versions of a firmware program, where these other compatible versions are not loaded to the hardware component. In such scenarios, embodiments may reject any update that is not identified within this compatibility information, or where the update is presented with version information that is inconsistent with the version information from the firmware manifest, such as use of non-sequential or otherwise non-standard version information.

In scenarios where the received firmware update is not inconsistent with the existing firmware image, at 350, the received firmware update is transmitted to the managed hardware component by the remote access controller. Upon receipt by managed hardware component, the updated firmware may be used to overwrite the firmware stored within a particular area of the firmware image, where this area may be determined based on the firmware boundaries specified in the firmware manifest. For instance, a firmware update providing updated instructions for adapting the operation of a hardware accelerator for a particular machine learning computations may be stored to the storage locations defined by a set of firmware boundaries that have been designated for storing firmware used to adapt the operations of the hardware accelerator, where the existing firmware may perform the same or different computations from the updated firmware. In this manner, received firmware updates may be transmitted for storage by a managed hardware component only if the received firmware is compatible with the existing firmware image utilized by managed hardware component.

As indicated in FIG. 3, in scenarios where the firmware update is compatible with the current firmware image and has been transmitted to the managed hardware component, at 355, the remote access controller updates the firmware manifest. In particular, the remote access controller may update the firmware boundaries specified in the metadata of the firmware manifest. Based on these updates, the updated firmware boundaries may now specify storage locations for the updated firmware instructions that are now available to the managed hardware component. Upon updating the firmware manifest, the remote access controller may digitally sign the updated firmware manifest using the described cryptographic capabilities of the remote access controller. Once an updated firmware manifest has been digitally signed, at 360, the signed updated firmware manifest may be transmitted to the managed hardware component, or to the location at which the signed firmware manifest for the managed hardware component is being stored.

In some scenarios, a received firmware update may be incompatible with the existing firmware image. In some instances, a received firmware update that is incompatible with existing firmware may be a result of an administrative error, where the error may arise from manual or automated configuration of managed systems. In other instances however, a received firmware update that is incompatible with existing firmware may be indicative of a malicious firmware update that is being presented. For instance, a presented firmware update that is significantly larger in size than the existing firmware, as determined by the firmware boundaries of the existing firmware within the firmware image, may be indicative of a malicious firmware update that is presented without knowledge of the existing firmware image in use by the managed hardware component.

Accordingly, in scenarios where a received firmware update is incompatible with the information specified in the firmware manifest, at 365, the remote access controller discards the received firmware update without transmitting it to the managed hardware component. At 370, the managed hardware component is instead operated using existing firmware. In some embodiments, in response to detecting receipt of an incompatible firmware update, the remote access controller may revert the firmware utilized by a hardware component to factory provisioned default firmware, or other firmware that can be affirmatively validated. In some embodiments, a hardware component may be disabled in response to the receipt of an incompatible firmware update for this particular hardware component, thus preemptively treating the hardware component as compromised.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) comprising:
one or more CPUs utilizing one or more buses that connect to a plurality of hardware components of the IHS, the plurality of hardware components comprising one or more network controllers; and
a remote access controller that interfaces with the one or more CPUs via a plurality of inband busses of the IHS and that support remote management of the plurality of hardware components of the IHS via a plurality of sideband management busses connecting the remote access controller directly to respective hardware components of the IHS, wherein the remote management comprises management of firmware updates for the plurality of hardware components of the IHS, the remote access controller comprising a logic unit and a memory device having instructions stored thereon that, upon execution by the logic unit, cause the remote access controller to:
during factory provisioning of the IHS, sign a firmware manifest of instructions within a firmware image loaded for operation by a first of the plurality of hardware components of the IHS and store the signed firmware manifest to a secured memory of the remote access controller, wherein the signed firmware manifest specifies two or more delineated sets of firmware instructions within the firmware image, each delineated set of firmware instructions defined by one or more boundaries within a firmware image, and wherein the signed firmware manifest comprises a mapping of different firmware versions that can be assembled from the delineated sets of firmware instructions located within the boundaries of the firmware image;
upon deployment of the IHS and while the one or more network controllers are unable to connect to any external networks, receive a request to update firmware used to operate the first hardware component;
in response to the firmware update request and while the one or more network controllers are unable to connect to any external networks, retrieve the signed firmware manifest from the secured memory of the remote access controller;
based on the signed firmware manifest and while the one or more network controllers are unable to connect to any external networks, determine whether the received firmware update request is consistent with the one or more boundaries of the firmware image that is loaded for operation by the first hardware component;
when the received firmware update request is consistent with the loaded firmware: assemble the requested firmware update from a plurality of the delineated sets of firmware instructions located in the boundaries of the firmware image, replace at least a portion of the loaded firmware with the assembled requested firmware update, update the manifest to specify updated firmware boundaries that specify storage locations for updated firmware instructions in the assembled requested update, and sign the updated firmware manifest; and
when the received firmware update request is not consistent with the loaded firmware, prevent use of the requested firmware update.

2. The IHS of claim 1, wherein the firmware manifest is used to evaluate the consistency of the requested firmware update with the loaded firmware during an interval while the one or more network controllers are unable to connect to any external networks that can be used to interface with a certificate authority that can validate authenticity of the requested firmware update.

3. The IHS of claim 1, wherein the consistency of the firmware update with the loaded firmware is determined while the one or more network controllers are unable to connect to any networks based on whether a size of the requested firmware update is consistent with a size of the firmware image stored by the first hardware component.

4. The IHS of claim 1, wherein the firmware manifest is signed during factory provisioning of the IHS by the remote access controller using a private keypair generated by the remote access controller.

5. The IHS of claim 4, wherein the signed firmware manifest is cryptographically bound to the remote access controller based on the remote access controller generating the private keypair used to sign the manifest.

6. The IHS of claim 1, wherein the first hardware component comprises a hardware accelerator and wherein the requested firmware update switches a mode of operation by the hardware accelerator.

7. The IHS of claim 1, wherein the firmware manifest comprises a mapping of boundaries of the delineated sets of firmware within the firmware image, and wherein the delineated sets of firmware within the firmware image enable different modes of operations by the first hardware component.

8. The IHS of claim 1, wherein the consistency of the requested firmware update with the loaded firmware is determined based on whether a size of the requested firmware update is consistent with one or more sizes of the mapped boundaries of the delineated sets of firmware within the firmware image.

9. The IHS of claim 8, wherein the requested firmware update comprises an update to a portion of the firmware image stored within a mapped firmware boundary specified in the firmware manifest, and wherein the update to the mapped firmware boundary of the firmware image enables or disables a feature of the first hardware component.

10. The IHS of claim 1, wherein prevent use of the requested firmware update comprises deletion of the firmware update by the remote access controller without transmitting any portion of the firmware update to the first hardware component.

11. A method for preventing nonsecure updates to firmware of a hardware component of an Information Handling System (IHS), wherein the firmware updates are managed by a remote access controller of the IHS that provides management of the hardware component by administrative tools remote from the IHS, the method comprising:
during factory provisioning of the IHS, signing a manifest of instructions within a firmware image loaded for operation by the hardware component of the IHS and storing the signed firmware manifest to the IHS, wherein the firmware manifest specifies two or more delineated sets of firmware instructions within the firmware image, each delineated set of firmware instructions defined by one or more boundaries within the firmware image, and wherein the signed firmware manifest comprises a mapping of different firmware versions that can be assembled from the delineated sets of firmware instructions located in the boundaries of the firmware image;

upon deployment of the IHS and during an interval when the IHS does not have access to external networks:

receiving a request to update firmware used to operate the hardware component;

in response to the firmware update request, retrieving the signed manifest of loaded firmware that was stored to the IHS during factory provisioning of the IHS;

based on the firmware manifest, determining whether the received firmware update request is consistent with the one or more boundaries of the firmware image that is loaded for operation by the hardware component;

when the received firmware update request is consistent with the loaded firmware: assembling the requested firmware update from a plurality of the delineated sets of firmware instructions located in the boundaries of the firmware image, replacing at least a portion of the loaded firmware with the assembled requested firmware update, updating the manifest to specify updated firmware boundaries that specify storage locations for updated firmware instructions in the assembled requested update, and signing the updated firmware manifest; and when the received firmware update request is not consistent with the loaded firmware, preventing use of the requested firmware update.

12. The method of claim 11, wherein the consistency of the firmware update with the loaded firmware is determined based on whether a size of the firmware update is consistent with a size of the firmware image stored by the hardware component.

13. The method of claim 12, wherein the hardware component comprises a hardware accelerator and wherein the requested firmware update switches a mode of operation by the hardware accelerator.

14. The method of claim 11, wherein the hardware component is provisioned with a link that indicates a location of the signed firmware manifest in a secure storage of the IHS.

15. The method of claim 12, wherein the consistency of the requested firmware update with the loaded firmware is further determined based on whether a size of the firmware update is consistent with one or more sizes of the mapped firmware boundaries within the firmware image.

16. A system comprising:

a hardware component of an Information Handling System (IHS), wherein operations of the hardware component may be adapted based on updates to firmware utilized by the hardware component; and a remote access controller installed on a motherboard of the IHS and supporting remote management of the hardware component by tools that are remote from the IHS, the remote access controller comprising a logic unit and a memory device having instructions stored thereon that, upon execution by the logic unit, cause the remote access controller to:

during factory provisioning of the IHS, sign a firmware manifest of two or more delineated sets of firmware instructions within a firmware image loaded for operation by the hardware component and store the signed firmware manifest to the IHS, wherein each delineated set of firmware instructions is defined by one or more boundaries within the firmware image, and wherein the signed firmware manifest comprises a mapping of different firmware versions that can be assembled from the delineated sets of firmware instructions located in the boundaries of the firmware image;

upon deployment of the IHS and while the IHS is unable to connect to any external networks, receive a request to update firmware used to operate the hardware component;

in response to the request to update firmware and while the IHS is unable to connect to any external networks, retrieve the signed firmware manifest;

based on the firmware manifest and while the IHS is unable to connect to any external networks, determine whether the request to update firmware is consistent with the one or more boundaries of the firmware image that is loaded for operation by the hardware component;

when the request to update firmware is consistent with the loaded firmware: assemble the requested firmware update from a plurality of the delineated sets of firmware instructions located in the boundaries of the firmware image, replace at least a portion of the firmware loaded during the factory provisioning of the IHS with the assembled requested firmware update, update the manifest to specify updated firmware boundaries that specify storage locations for updated firmware instructions in the assembled requested update, and sign the updated firmware manifest; and when the request to update firmware is not consistent with the loaded firmware, prevent use of the requested firmware update.

17. The system of claim 16, wherein the consistency of the received firmware update request with the loaded firmware is evaluated during an interval where the IHS does not have access to any external networks that can be used to interface with a certificate authority that can validate authenticity of the requested firmware update.

18. The system of claim 16, wherein the consistency of the received firmware update request with the loaded firmware is determined based on whether a size of the requested firmware update is consistent with a size of the firmware image stored by the hardware component.

19. The system of claim 16, wherein the firmware manifest is signed by the remote access controller using a private keypair generated by the remote access controller.

20. The system of claim 16, wherein the preventing of the use of the firmware update comprises deletion of the firmware update by the remote access controller without transmitting any portion of the firmware update to the hardware component.

* * * * *